June 8, 1943.  F. W. GERARD  2,321,137
REFRIGERATING APPARATUS
Filed Jan. 24, 1941  3 Sheets-Sheet 1

INVENTOR.
Frank W. Gerard
BY Spencer, Hardman & Fisher

June 8, 1943. F. W. GERARD 2,321,137
REFRIGERATING APPARATUS
Filed Jan. 24, 1941 3 Sheets-Sheet 2
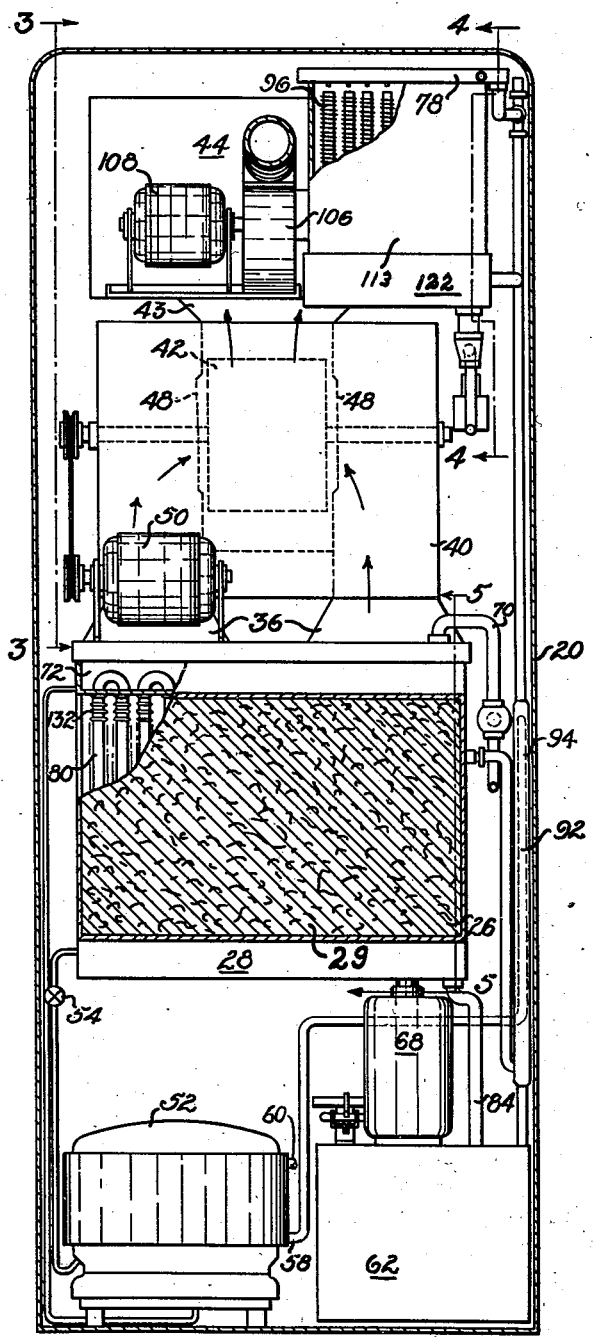
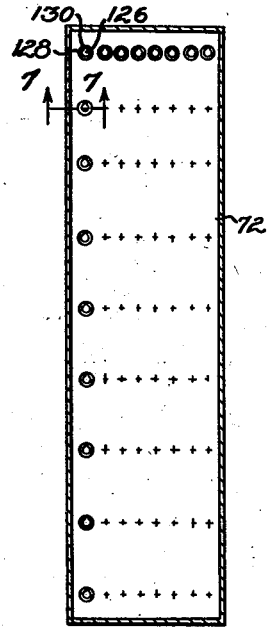
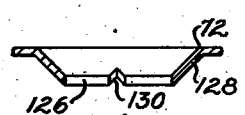
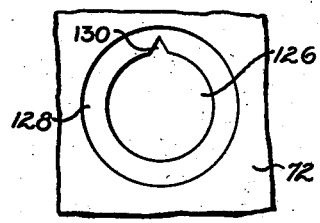
INVENTOR.
Frank W. Gerard
BY Spencer, Hardman & Fehr June 8, 1943.  F. W. GERARD  2,321,137
REFRIGERATING APPARATUS
Filed Jan. 24, 1941   3 Sheets-Sheet 3

INVENTOR.
Frank W. Gerard
BY Spencer, Hardman & Fehr

Patented June 8, 1943

2,321,137

UNITED STATES PATENT OFFICE 2,321,137

REFRIGERATING APPARATUS

Frank W. Gerard, Oakwood, Ohio, assignor to General Motors Corporation, Dayton, Ohio, a corporation of Delaware Application January 24, 1941, Serial No. 375,824

1 Claim. (Cl. 62—129)

This invention relates to refrigerating apparatus and more particularly to an improved method and apparatus for both cooling and drying air.

It has long been recognized that moisture may be removed from the air by flowing the air in contact with a deliquescent salt or a solution containing such a salt. Solutions of lithium chloride, calcium chloride or the like are commonly used for this purpose. However, chemical drying systems of this type have not been used extensively because of the fact that very cumbersome and expensive equipment has been necessary. Another reason for the lack of popularity of chemical drying systems is that in many applications cooling in addition to drying is required. It has not been considered practical as a general rule to provide a chemical drying system in addition to a mechanical cooling system, since a mechanical cooling system may be designed so as to be capable of removing a large quantity of moisture from the air as well as cooling the air. It is an object of this invention to so design and arrange the parts of a mechanical cooling system and a chemical drying system so as to mount both systems in a single cabinet very little larger than that required for housing an ordinary mechanical refrigerating system.

It is another object of this invention to provide a compact self-contained unit which is not only efficient in operation but also inexpensive to manufacture.

One object of this invention is to provide improved heat exchange coils which require a minimum amount of space.

One object of this invention is to provide an improved arrangement for distributing a hygroscopic liquid over the outer surface of a heat exchange coil.

A further object of this invention is to provide a simplified arrangement for drying air by means of a hygroscopic medium and for regenerating the hygroscopic medium.

A further object of this invention is to provide an improved control system for a combined cooling and drying system.

Further objects and advantages of the present invention will be apparent from the following description, reference being had to the accompanying drawings, wherein a preferred form of the present invention is clearly shown.

In the drawings:

Fig. 2 is a sectional view, with parts broken away, taken on the line 2—2 of Fig. 1;

Fig. 6 is a plan view, partly diagrammatic, showing the distributor for the hygroscopic medium;

Fig. 7 is an enlarged fragmentary sectional view taken on the line 7—7 of Fig. 6;

Fig. 8 is a plan view of the structure shown in Fig. 7; and

Figure 9:
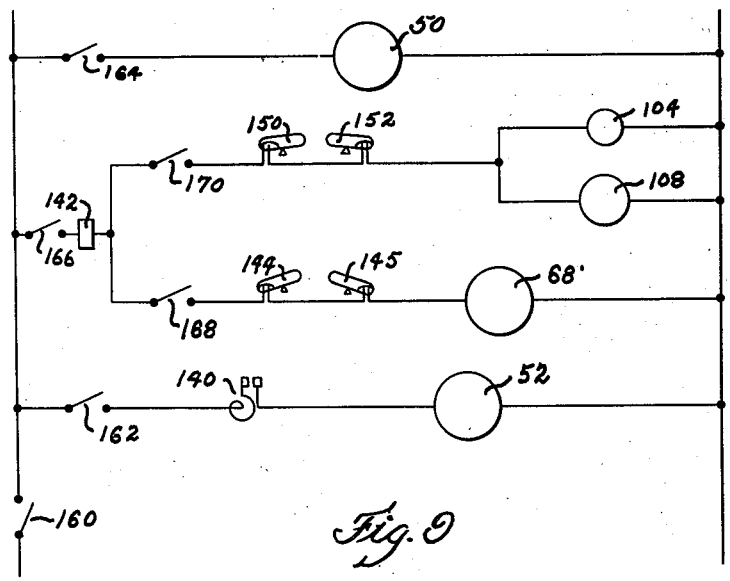

Fig. 9 diagrammatically shows the electrical control circuits.

Figure 1:
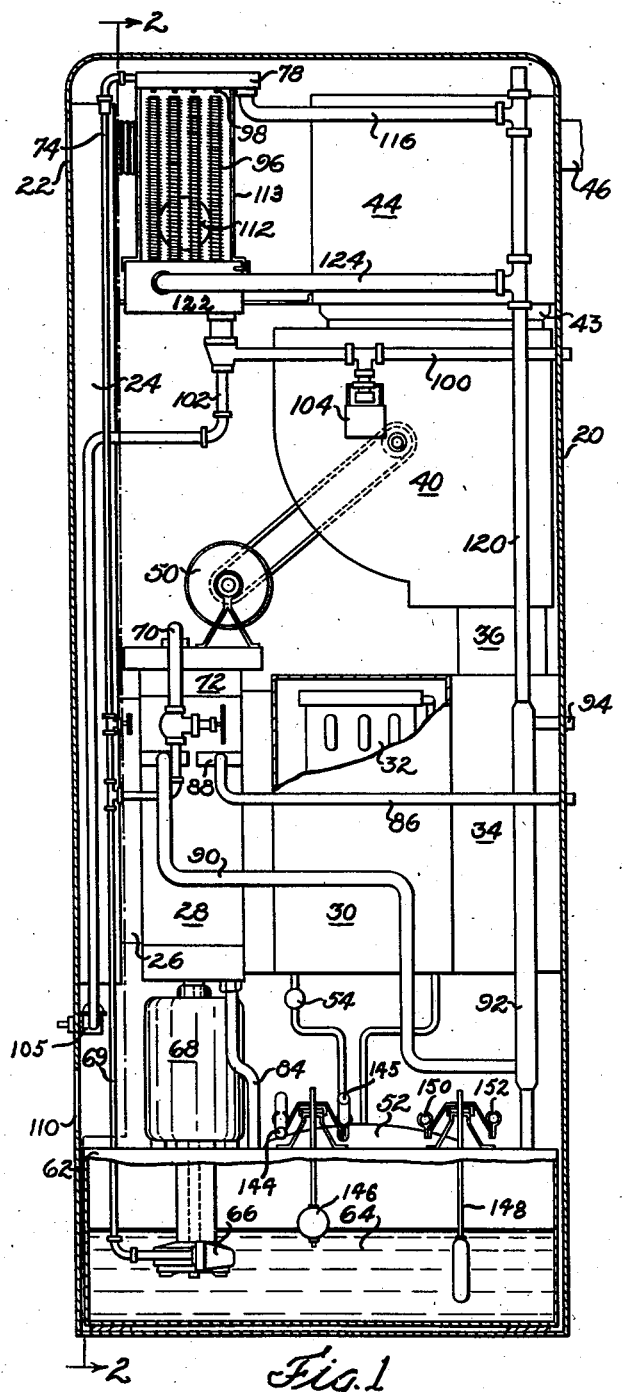
Fig. 1 is an elevational view, with parts broken away, showing the arrangement within the main air conditioning cabinet.

Referring to Fig. 1, in which I have shown a preferred arrangement of elements, reference character 20 designates an outer casing within which is mounted a complete mechanical refrigerating system and chemical drying system. Air to be conditioned enters the cabinet 20 through one or more inlets 22 arranged adjacent the top of the cabinet 20. The number of inlets provided is determined by the number of rooms from which air to be conditioned is withdrawn. The entering air flows downwardly through a duct 24 which communicates with a duct 26, which in turn directs the air through the drying unit 28 described hereinafter. An air filter 29 is mounted in the duct 26 as shown in Fig. 2. The air flowing through the drying unit 28 discharges into the evaporator chamber 30 within which is mounted the refrigerant evaporator 32. Air leaving the evaporator chamber 30 flows into the chamber 34 which communicates with a pair of ducts 36 (Fig. 2) leading to the main blower housing 40. A centrifugal type of blower 42 discharges the conditioned air into the duct 43 leading to the plenum chamber 44 from which the air discharges through one or more outlet ducts such as 46 shown in Figs. 1 and 3. The number of outlet ducts is determined by the number of rooms to be supplied with conditioned air.

Referring to Fig. 2, it will be observed that the air flowing upwardly through the ducts 36 enters the main fan chamber through the usual intake openings 48 and discharges through the outlet 43 leading to the plenum chamber 44. The blower 42 is driven by means of an electric motor 50 which normally operates continuously.

The evaporator 32 is supplied with liquid refrigerant by the motor-compressor-condenser unit 52. The flow of refrigerant to the evaporator may be controlled by means of a conventional refrigerant flow regulating valve, such as 54, arranged in the liquid refrigerant line or it may be controlled by means of a fixed restrictor. The motor-compressor-condenser unit 52 is preferably of the type disclosed in the Gould Patent No. 2,205,138. Cooling water is supplied to the unit 52 through the cooling water inlet 58 and is discharged through the outlet 60.

Figure 5:
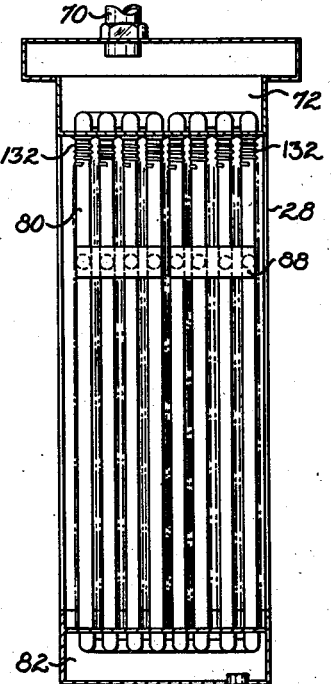
Fig. 5 is a sectional view taken on the line 5—5 of Fig. 2.

Reference character 62 designates a sump within which a supply of hygroscopic liquid 64 is provided. Any type of hygroscopic liquid may be used, but lithium chloride is preferably used since only a small amount of lithium chloride is required to absorb a large amount of moisture. A pump 66, driven by means of a motor 68, circulates hygroscopic medium from the sump 64 through the pipe line 69 which, in turn, has one branch line 70 leading to the distributor 72 and a second branch line 74 leading to the distributor 78. The hygroscopic solution supplied to the distributor 72 is distributed onto the outer surfaces of the cooling coil 80 arranged in the path of the air flowing through the drying unit 28. The details of the coil 80 and the means for distributing the hygroscopic medium over the outer surfaces of the coil 80 is described in greater detail hereinafter. The hygroscopic medium flowing over the outer surfaces of the coil 80 is cooled thereby and serves to remove moisture from the air flowing thereover. The hygroscopic medium flowing over the outer surface of the coil 80 collects in the sump 82 (Fig. 5) from whence it returns to the main sump 62, through the return line 84.

Cooling water is supplied to the distributor 88 of the cooling coil 80 through the pipe line 86. The water leaving the coil 80 flows through the pipe line 90 which leads to the heat interchanger 92, the purpose of which will be described hereinafter. The water leaves the heat interchanger 92 through the outlet 94. In order that the water removed from the air may be dissipated from the hygroscopic solution, that portion of the hygroscopic solution flowing through the line 74 enters the distributor 78 which distributes the hygroscopic medium onto the finned tube elements 96 which are supplied with a heating medium in the manner explained hereinafter. As shown in Fig. 2, the outlet 94 may be connected to the water inlet 58 of the motor-compressor-condenser unit 52.

Figure 4:
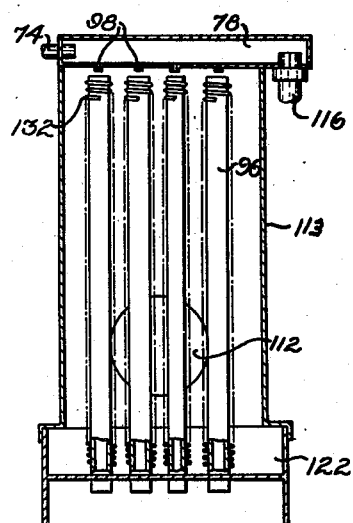
Fig. 4 is a sectional view taken on line 4—4 of Fig. 2.

As shown in Fig. 4, the distributor 78 is provided with a plurality of drain holes 98 from which the hygroscopic medium drips onto the finned tubing 96. Steam is supplied to the finned tubes 96 through the steam line 100 and the condensate from the steam discharges through the liquid line 102 in accordance with well-known steam heating practice which needs no further description. The flow of steam to the tubes 96 is controlled by the solenoid valve 104 located in the line 100. A conventional steam trap 105 is provided in the line 102. The hygroscopic medium flowing over the heated tubes 96 gives off a considerable quantity of water vapor. This vapor is removed from the cabinet along with the air circulated through the cabinet by the fan unit 106.

Figure 3:
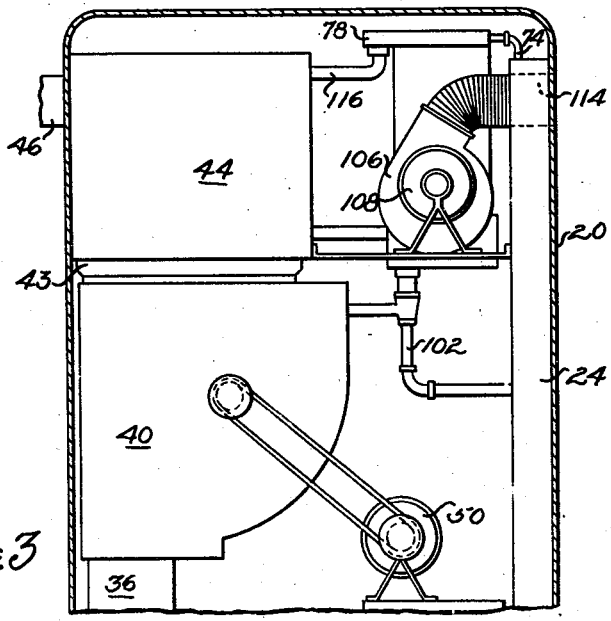
Fig. 3 is a fragmentary sectional view taken on the line 3—3 of Fig. 2.

The fan 106 is arranged in the upper portion of the cabinet as shown in Figs. 2 and 3 and is driven by a motor 108. While I have shown two separate motors for operating the fans 42 and 106, it is within the purview of this invention to use one motor for operating both fans. An opening 110 admits air into the main cabinet 20 adjacent the lower portion of the cabinet. This air circulates upwardly through the cabinet over the steam heated tubes 96 and is withdrawn from the upper portion of the cabinet by the fan 106. The intake 112 of the fan 106 is located in the end wall of the shield 113 which encloses three sides of the heated tubes 96. The fan 106 discharges the moisture laden air through an outlet 114 (Fig. 3). The distributor 78 is provided with an overflow pipe 116 (Fig. 1) which communicates with the return line 120 leading to the main sump 62. The hygroscopic medium flowing over the outer surface of the finned tubes 96 collects in the sump 122 from whence it enters the line 124 which also communicates with the return line 120 leading to the sump 62. In order to partially cool the liquid flowing through the return line 120, this liquid is caused to flow through the inner passage of the heat interchanger 92. The hygroscopic medium collected in the sump 122 is relatively warm and concentrated.

In Figs. 6, 7 and 8, I have shown detailed views of the bottom wall of the distributor 72. The distributor 72 is provided with a plurality of apertures 126 through which the various sections of coil 80 pass. As shown in Fig. 7, the material adjacent each of the apertures 126 is depressed as at 128. A notch 130 is provided in each of the depressed portions adjacent the tube. This notch is of such a size as to allow the desired quantity of hygroscopic medium to flow therethrough. Each upright section of the coil 80 is provided with a spiral fin 132 which is preferably in the form of a wire wrapped around the outer surface of the tubing. A similar wire is wrapped around each of the tubes 96 of the heating element. In constructing the spiral fins 132, wire is formed into the shape of a long coil spring. This coil is thereafter placed around the outside of the tubing. One end of the wire is arc tack welded to the tubing and the coiled portion of the wire is thereafter twisted tightly to the tubing after which the other end is arc tack welded to the tubing. After both ends of the wire have been secured to the tubing and the tubes have been assembled into a complete unit, the entire unit is treated by hot galvanize. After the hot galvanize treatment, the zinc surface is further treated with a chromic acid solution which leaves a film on the outer surface of the unit. It has been found that this film very materially facilitates the spreading of the lithium chloride solution in a very thin film over the entire surface. This film also inhibits corrosion of the zinc.

The return bends may be formed separate in accordance with any conventional practice which need not be described since any one skilled in the art is familiar with the formation of return bends on finned heat exchange coils.

As shown in Fig. 9 of the drawings, a thermostat 140 which is preferably mounted within the conditioned space controls the operation of the motor-compressor condenser unit 52. A humidostat 142 controls the operation of the pump motor 68, the steam valve 104 and the fan motor 108. The pump motor 68 is further controlled by the mercury contact switches 144 and 145 operated by the float 146 located in the sump 62. The arrangement of the switches 144 and 145 is such that the circuit to the pump motor 68 is broken in the event that the amount of liquid in the sump 62 becomes too great or too small. By virture of this arrangement, a leak in the hygroscopic liquid circuit, or a failure of the regenerating apparatus would serve to automatically stop the pump motor 68.

A hydrometer 148 controls a pair of mercury contact switches 150 and 152 arranged in series with the fan motor 108 and the valve 104. The arrangement of the switches 150 and 152 is such that the circuit through the switches is broken whenever the concentration falls below a predetermined low value or exceeds a predetermined high value. By virtue of the above described arrangement the hygroscopic liquid will be maintained at the proper concentration at all times and in the event that the concentrating apparatus fails to function due to some mechanical failure, then the accumulation of excess water in the hygroscopic liquid will serve to break the circuit to the motor 108 and the valve 104.

A plurality of manual switches have been provided for individually controlling the various electrical circuits as shown in Fig. 9. Switch 160 is provided for deenergizing the entire system. Switches 162 and 164 control the refrigerating apparatus 52 and the main blower motor 50, respectively. Switch 166 is in series with the humidostat 142, whereas switches 168 and 170 control the elements 68, 104 and 108, as shown.

While the form of embodiment of the invention as herein disclosed, constitutes a preferred form, it is to be understood that other forms might be adopted, all coming within the scope of the claim which follows.

What is claimed is as follows:

In combination, a cabinet, a first air flow passage in said cabinet, a second air flow passage in said cabinet, a first cooling coil in said first air flow passage, a second cooling coil in said first air flow passage, a sump in said cabinet adapted to contain a hygroscopic liquid, means for spraying hygroscopic liquid from said sump over said first cooling coil so as to cool said liquid and simultaneously cause said liquid to remove moisture from the air in said first air flow passage, a regenerating coil in said second named air flow passage, means for supplying a heating medium to said regenerating coil, means for circulating hygroscopic liquid from said sump over said regenerating coil so as to regenerate said hygroscopic liquid, means for circulating air to be conditioned through said first named passage, means for flowing air through said second named passage in said cabinet so as to carry away the moisture liberated from the hygroscopic medium circulating over said regenerating coil, refrigerant liquefying means in said cabinet for supplying refrigerant to said second named cooling coil, said last named means including a water coil for absorbing heat, and means for supplying cooling water to said first named coil and said water coil in series.

FRANK W. GERARD.